(12) United States Patent
Byun et al.

(10) Patent No.: US 10,820,741 B2
(45) Date of Patent: Nov. 3, 2020

(54) REMOVAL OF A CAPSULE FROM A CAPSULE HOLDER

(71) Applicant: NESTEC S.A., Vevey (CH)

(72) Inventors: Da Mi Byun, Lausanne (CH); Souleymane Diouf, Ins (CH); Ian Guy, London (GB); Stefan Kaeser, Aarau (CH)

(73) Assignee: Societe des Produits Nestle S.A., Vevey (CH)

(*) Notice: Subject to any disclaimer, the term of this patent is extended or adjusted under 35 U.S.C. 154(b) by 307 days.

(21) Appl. No.: 15/760,255

(22) PCT Filed: Sep. 16, 2016

(86) PCT No.: PCT/EP2016/071916
§ 371 (c)(1),
(2) Date: Mar. 15, 2018

(87) PCT Pub. No.: WO2017/046294
PCT Pub. Date: Mar. 23, 2017

(65) Prior Publication Data
US 2018/0263406 A1    Sep. 20, 2018

(30) Foreign Application Priority Data
Sep. 18, 2015  (EP) ................ EP15185946

(51) Int. Cl.
*A47J 31/36* (2006.01)
*A47J 31/40* (2006.01)
*B65D 85/804* (2006.01)

(52) U.S. Cl.
CPC ....... *A47J 31/3638* (2013.01); *A47J 31/3633* (2013.01); *A47J 31/407* (2013.01); *B65D 85/8046* (2013.01)

(58) Field of Classification Search
CPC .. A47J 31/3633; A47J 31/3638; A47J 31/407; B65D 85/8046
See application file for complete search history.

(56) References Cited

U.S. PATENT DOCUMENTS

| 5,776,527 | A  | * | 7/1998 | Blanc | A47J 31/3633 |
| | | | | | 426/77 |
| 7,320,274 | B2 | * | 1/2008 | Castellani | A47J 31/0673 |
| | | | | | 99/289 R |

(Continued)

FOREIGN PATENT DOCUMENTS

| CN | 102551540 A | * | 7/2012 | ......... A47J 31/3633 |
| DE | 10201006389 A1 | * | 6/2012 | |

(Continued)

OTHER PUBLICATIONS

Japan Patent Office Communication for Application No. 2018-512256, Dispatch No. 330550, dated Aug. 18, 2020 (6 pages).

*Primary Examiner* — Jacob J Cigna
(74) *Attorney, Agent, or Firm* — K&L Gates LLP

(57) ABSTRACT

A capsule processing machine (1) for preparing a beverage from a capsule (5) having a body (50) containing an ingredient and a peripherally projecting flange (51) comprises: a capsule holder (10) with an upwardly oriented mouth (12) for receiving the capsule (5) via the mouth (12) so that the capsule flange (51) extends generally in parallel to the mouth (12); a capsule transfer device (30) having a capsule guide (31) for guiding the capsule (5) from the capsule holder (10) to a used-capsule evacuation area (40). The capsule guide (31) comprises a pair of facing slides (311, 312) having each a holding section (311a, 312a) configured to hold the capsule (5) between the slides (311, 312) under the flange (51) and hold the capsule (5) above the capsule holder (10). The capsule transfer device (30) comprises a capsule mover (35) for moving the capsule (5) from the (Continued)

holding section (311*a*, 312*a*) to the used-capsule evacuation area (40).

17 Claims, 2 Drawing Sheets

(56) References Cited

U.S. PATENT DOCUMENTS

| | | | |
|---|---|---|---|
| 9,119,504 B2 * | 9/2015 | Bugnano | A47J 31/30 |
| 9,486,106 B2 * | 11/2016 | Etter | A47J 31/3638 |
| 2013/0068110 A1 * | 3/2013 | Pagano | A47J 31/3638 |
| | | | 99/295 |
| 2013/0183130 A1 * | 7/2013 | Etter | A47J 31/3638 |
| | | | 414/738 |

FOREIGN PATENT DOCUMENTS

| | | | | |
|---|---|---|---|---|
| EP | 1900314 | | 3/2008 | |
| EP | 1900314 A1 * | | 3/2008 | A47J 31/3638 |
| EP | 2036468 | | 3/2009 | |
| EP | 2915465 | | 9/2015 | |
| JP | 2011513023 A | | 4/2011 | |
| WO | 2012041605 | | 4/2012 | |
| WO | 2013116056 | | 8/2013 | |

* cited by examiner

REMOVAL OF A CAPSULE FROM A CAPSULE HOLDER

CROSS REFERENCE TO RELATED APPLICATIONS

The present application is a National Stage of International Application No. PCT/EP2016/071916, filed on Sep. 16, 2016, which claims priority to European Patent Application No. 15185946.9, filed on Sep. 18, 2015, the entire contents of which are being incorporated herein by reference.

FIELD OF THE INVENTION

The field of the invention pertains to beverage preparation machines using capsules, of an ingredient of the beverage to be prepared and to the removal of such capsules from the machines.

For the purpose of the present description, a "beverage" is meant to include any human-consumable liquid substance, such as tea, coffee, hot or cold chocolate, milk, soup, baby food, etc. . . . . A "capsule" is meant to include any container such as a packaging for containing a pre-portioned beverage ingredient, e.g. a flavouring ingredient, the packaging forming an enclosure of any material, in particular an airtight or pervious material, porous or non-porous material, e.g. plastic, aluminium, recyclable and/or biodegradable packagings, and of any shape and structure, including soft pods or rigid cartridges for containing the ingredient.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Brewing devices have been developed to facilitate insertion of a "fresh" capsule and removal of the capsule upon use. Examples of such brewing devices are disclosed in EP 1 767 129, WO 2009/043630, WO 2005/004683 and WO 2007/135136. The preparation of a beverage by using centrifugation is also known. Examples of centrifugation processes and corresponding devices are disclosed in WO2008/148601, WO2008/148650, U.S. Pat. No. 5,566,605, WO 2013/007776, WO 2013/007779 and WO 2013/007780.

Irrespectively of the extraction process itself it has also been proposed to facilitate the handling of capsules by system for extracting them, in particular by motorizing the opening and/or closure of the extraction system for inserting and/or removing a capsule. Examples of such systems are for example disclosed in EP 1 767 129, WO2009/113035, WO 2012/025258, WO 2012/025259, WO 2012/041605, WO 2013/127476, WO 2014/096122 and WO 2014/096123.

The preparation of a beverage by using centrifugation is also known. Such beverage preparation includes: providing a beverage (flavoring) ingredient, e.g. as powder and/or leaves, in a capsule; circulating liquid into the capsule and rotating the capsule at sufficient speed to ensure interaction of the liquid with the ingredient while creating a gradient of pressure of liquid in the capsule. Such pressure increases gradually from the centre towards the periphery of the capsule. As liquid traverses the ingredient, e.g. coffee bed, extraction of the ingredient, e.g. coffee compounds, takes place and a liquid extract is obtained that flows out at the periphery of the capsule. Examples of such systems are disclosed in WO2008/148601, WO 2013/007776, WO 2013/007779 and WO 2013/007780.

SUMMARY OF THE INVENTION

The invention relates to a capsule processing machine for preparing a beverage from at least one ingredient. Normally such beverage is then dispensed to a user, e.g. to a user-cup or user-mug.

For instance, the machine is a coffee, tea, chocolate, cacao, milk or soup preparation machine. For example, the machine is arranged for preparing within a beverage processing module that includes the capsule holder, a beverage by passing hot or cold water or another liquid through a capsule held in the holder containing an ingredient, such as a flavouring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 250 ml, e.g. the volume for filling a cup or mug, depending on the type of beverage. Formed and dispensed beverages may be selected from ristrettos, espressos, lungos, cappuccinos, café latte, americano coffees, teas, etc. . . . . For example, a coffee machine may be configured for dispensing espressos, e.g. an adjustable volume of 20 to 60 ml per serving, and/or for dispensing lungos, e.g. a volume in the range of 70 to 200 ml per serving.

An aspect of the invention relates to a capsule processing machine for preparing a beverage from a capsule having a body containing an ingredient and a peripherally projecting flange. For instance, the machine is configured to prepare a beverage by circulating a liquid into such capsule and centrifugally driving such capsule, e.g. as discussed above.

The machine includes a capsule holder delimiting a cavity with an upwardly oriented mouth (e.g. opening delimited by a holder's rim), such as a mouth generally contained in a horizontal plane, for receiving the capsule via the mouth so that the capsule flange extends generally in parallel to the mouth. For instance, the capsule holder is drivable in rotation by a motorized drive axis.

For instance, the machine incorporates the features disclosed in WO 2014/096122 or WO 2014/096123.

The machine has a capsule transfer device with a capsule guide for guiding the capsule from the capsule holder to a used-capsule evacuation area, For instance, the evacuation area has at least one of an evacuation channel, e.g. an inclined evacuation ramp, and a used-capsule collector.

The capsule guide includes a pair of facing slides having each a holding section configured to hold, e.g. seize, the capsule between the slides under the flange and hold the capsule above the capsule holder. For instance, the holding section is configured to lift the capsule above the capsule holder and/or to maintain the capsule above the capsule holder while the capsule holder is withdrawn under the capsule.

The capsule holder can be incorporated into an ingredient processing module of a beverage preparation device, typically of the centrifugal type, e.g. as disclosed in EP 2 000 062, EP 2 155 020, EP 2 152 128, WO 2008/148646, WO 2009/106175, WO 2009/106589, WO 2010/026045, WO 2010/026053, WO 2010/066736, WO 2008/148650, WO 2008/148834, WO 2010/066705, WO 2010/063644 and WO 2011/023711. The capsule may be of the type described above under the header "field of the invention". The capsule may be a capsule that has a container-body, e.g. a generally cup-shaped or hemispherical or hemi-ellipsoidal body, having a flange to which a cover lid is attached, in particular sealed. Typically the capsule contains a beverage ingredient.

A beverage may be prepared by circulating a liquid into a capsule containing a beverage ingredient which capsule is housed in the capsule holder and centrifugally driving such capsule in the capsule holder.

The machine is usually configured to circulate a liquid into the capsule, typically for mixing with the ingredient, e.g. brewing the ingredient, contained in the capsule. A flavoured beverage may be prepared by circulating a carrier liquid, such as water, into the capsule for mixing the carrier with the ingredient and form the beverage, e.g. by brewing. An automatic capsule recognition system may be used to parameterize and adjust the processing of the ingredient automatically in line with the type of ingredient.

Typically, the machine includes one or more of the following components:
a) a fluid system in fluid connection with the capsule holder;
b) an in-line heater and/or cooler for thermally conditioning a flow of liquid circulated into the capsule holder or a batch heater and/or cooler for circulating thermally conditioned liquid from the batch heater and/or cooler to the capsule holder;
c) a pump for pumping liquid to the capsule holder, in particular a low pressure pump e.g. within the range of 1 to 5 bar, such as 1.5 to 3 bar;
d) a motor for driving the capsule holder in rotation during beverage preparation;
e) an electric control unit, in particular comprising a printed circuit board (PCB), for receiving instructions from a user via an input user-interface and for controlling the heater and/or cooler, pump and motor(s); and/or
f) one or more sensors for sensing at least one characteristic selected from characteristics of fluid system, the heater and/or cooler, the pump, a liquid tank, an ingredient collector, a flow of the liquid (e.g. by a flowmeter), a pressure of the liquid and a temperature of the liquid, and for communicating such characteristic(s) to the control unit.

Moreover, the capsule holder is typically associated with a beverage collection and dispensing system, e.g. as disclosed in WO 2009/106175 and WO 2010/089329.

In accordance with the invention, the capsule transfer device includes a capsule mover for moving the capsule from the holding section to the used-capsule evacuation area. For instance, the capsule mover includes at least one of a mechanical, electromechanical, magnetic and electromagnetic actuator.

Hence, machine does not need to rely on gravity to move the capsule out of or away from or off the holding section but relies on a capsule mover. Consequently, the holding section can be made such as to safely hold the capsule in place until it is moved away by the capsule mover. For instance, the capsule is safely maintained on the holding section by friction or by a stop or by a resilient fastener or any other suitable means.

The capsule mover may include a capsule pusher and/or puller for pushing and/or pulling the capsule from the holding section to the used-capsule evacuation area. For instance, the capsule mover is configured to mechanically move the capsule. The capsule mover can be translationally and/or pivotally mounted. The capsule mover may form an arm that is mounted on a pivoting axis for pivoting between a collapsed position and a deployed position with a portion configured to intercept the capsule on the holding section and to move the capsule to the used-capsule evacuation area when the arm is pivoted from the collapsed position to the deployed position.

One or both slides of the pair of facing slides may include a wire or stripe or rail, such as a grooved rail or a head rail, to form the slide.

One or both slides of the pair of facing slides can have an introduction section leading to the holding section for guiding the capsule to the holding section prior to receiving the capsule in the cavity of the capsule holder via the mouth, such as an introduction section along which the capsule slides to the holding section under the effect of gravity. For instance, the introduction section is angled downwards towards the holding section. The introduction section may form an extension of the holding section, e.g. an extension downwardly angled to the holding section.

One or both slides of the pair of facing slides may have an evacuation section between which and along which the capsule slides to the used-capsule evacuation area under the effect of gravity. For instance, the evacuation section is angled downwards from the holding section and/or configured to hold the capsule between the slides under the flange.

The machine can have a top part, located above and facing the capsule holder, the capsule holder and the top part being relatively movable, such as movable automatically e.g. by a motor. The capsule holder and the top part can be relatively movable:
  into a relatively distant position for inserting the capsule into the capsule holder and for removing the capsule from the capsule holder with the capsule transfer device; and
  into a relatively close position for extracting the capsule in the capsule holder, such as a position in which the capsule holder and the top part form a generally confined extraction chamber.

The capsule holder and the top part can be translationally relatively movable from the distant position into the close position and vice versa, for instance along an axial direction of the cavity and/or along a straight line.

The top part may have a lid arrangement cooperating with the mouth of the capsule holder, e.g. a lid arrangement drivable in rotation via a motorized drive axis. Such as lid arrangement can have: one or more capsule opening elements, such as piercing blades and/or pins; and/or a liquid inlet, e.g. a central inlet, for feeding a liquid into the capsule and/or a liquid outlet, e.g. one or more peripheral outlets, for evacuating liquid from the capsule; and/or an axis of rotation, the lid arrangement being rotatably mounted in an outer housing and/or frame of the top part.

The capsule guide may include at least one connection part, each slide having for instance a pair of extremal connection parts, connected to the top part so that when the capsule holder and the top part are relatively moved:

into the relatively distant position, the capsule guide is relatively moved away from the capsule holder, e.g. for withdrawing the capsule held by the holding section out of the cavity of the capsule holder; and into the relatively close position, the capsule guide is relatively moved against the capsule holder, e.g. for introducing the capsule held by the holding section into the cavity of the capsule holder.

The capsule holder can have at least one controller, e.g. a control face along which the capsule guide is guided between the relatively distant and close positions, for moving the holding section:

away from the capsule body and from under the flange of the capsule when the capsule holder and the top part are relatively moved to the relatively close position; and against the capsule body and under the flange of the capsule when the capsule holder and the top part are relatively moved to the relatively open position.

The capsule guide may be configured to return automatically against the capsule body or away from the capsule body, e.g. by being mounted to the top part via a bias element such as a spring and/or by being made of a resilient element such as a spring element.

The machine can include a main machine body, such as a main body having an outside housing, the top part being configured to telescope, e.g. vertically, into and out from the main body between the distant and the closed positions, the capsule holder being optionally in the main body.

The top part may have an opening for supplying the capsule to the mouth of the capsule holder. For instance, the opening has one or more of the following features a), b) and c):

a) the opening leads to the holding section for instance via an introduction section of the capsule guide;
b) the opening has a shape generally matching a longitudinal cross-section of the capsule, e.g. a shape with opposite slots matching the capsule flange and optionally leading to the capsule guide such that when the capsule is passed via the opening its flange is taken on by the guide; and
c) the opening is configured to allow a passage of the capsule when the capsule holder and the top part are in the relatively distant position and configured to prevent a passage of the capsule when the capsule holder and the top part are in the relatively close position.

The capsule guide may have at least one stop element for immobilizing the capsule on the holding section, the capsule mover being configured for driving the capsule from the holding section over or beyond the stop element to the used-capsule evacuation area. For instance, at least one stop element includes one or more of:

a pair of stop elements generally facing one another on each side of the capsule when the capsule is driven over or beyond the stop elements by the capsule mover;

a stop element projecting from one of the slide urged against or into the capsule body of the capsule when the capsule is driven over or beyond the stop elements by the capsule mover, such as a pair of such stop elements facing each other, the stop element(s) being optionally formed by a bent part of the slides; and a stop element configured to be urged away by the capsule when the capsule is driven over the stop elements by the capsule mover, such as a pair of such stop elements facing each other; and/or a stop element configured to penetrate the capsule body when the capsule is driven over or beyond the stop elements by the capsule mover, such as a pair of such stop elements facing each other.

The holding section may extend generally in parallel to a plane generally containing the mouth of the cavity, e.g. a horizontal plane. The holding section and the plane can be relatively movable, e.g. for receiving the capsule in the cavity and/or for removing the capsule from the cavity, and remaining generally parallel to one another during the entire movement.

The holding section may extend in a generally horizontal direction to an evacuation section that extends down from the holding section, the pair of facing slides having an introduction section leading downwards to the holding section for guiding the capsule to the holding section prior to receiving the capsule in the cavity of the capsule holder via the mouth.

The capsule holder can include a support, e.g. an outer support and an ejector, e.g. in the support, movable relatively to the support, the ejector being configured to raise the flange of the capsule above the capsule holder so as to facilitate seizure of the capsule between the slides under the flange.

The ejector may delimiting at least part of the cavity.

The ejector can be mounted telescopically and/or resiliently, e.g. via a spring, to the outer support.

The capsule holder can be in fluid connection with a machine outlet, such as an outlet dispensing beverage to outside such machine. For instance, the outlet is in fluid connection with the capsule holder via a beverage collector such as a collector connected to a thermal conditioner, e.g. a heater and/or a cooler, for adjusting a temperature of the collector.

The invention also relates to a method of processing a capsule in a machine as described above. The method includes the steps of: holding the capsule between the slides under the flange to hold the capsule above the capsule holder; and moving the capsule with the capsule mover from the holding section to the used-capsule evacuation area.

Another aspect of the invention relates to a combination of a machine as described above and a capsule for being handled by the slides and the capsule mover.

A further aspect of the invention relates to a use of a capsule for: a machine as described above; being processed by a method as described above; or implementing a combination as described above.

The capsule may have a body that is symmetric or asymmetric, conical or frusto-conical or cylindrical or spherical or hemispherical or frusto-spherical, containing the ingredient, e.g. ground coffee, tea or cacao or another beverage ingredient.

BRIEF DESCRIPTION OF THE DRAWINGS

The invention will now be described with reference to the schematic drawings, wherein.

DETAILED DESCRIPTION

FIGS. 1 to 9 illustrate an exemplary embodiment of a capsule processing machine 1 and parts thereof in accordance with the invention.

Machine 1 is configured for preparing a beverage from a capsule 5 having a body 50 containing an ingredient and a peripherally projecting flange 51.

The beverage can be prepared by circulating a liquid into such capsule 5 and centrifugally driving such capsule 5.

Figure 1:
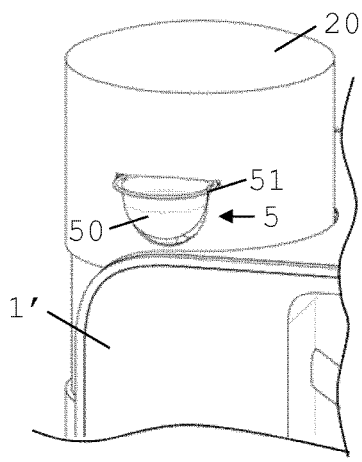
FIG. 1 is a perspective view of part of the outside of a machine according to the invention in a capsule loading configuration.
Figure 1A:
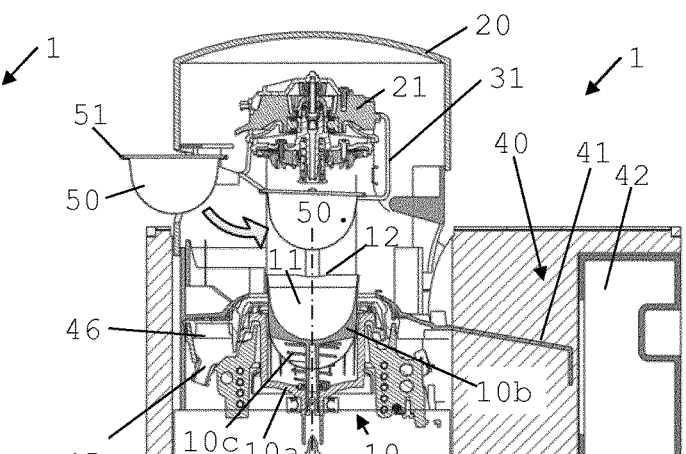
FIG. 1a is a cross-sectional view of the machine shown in FIG. 1.
Figure 4:
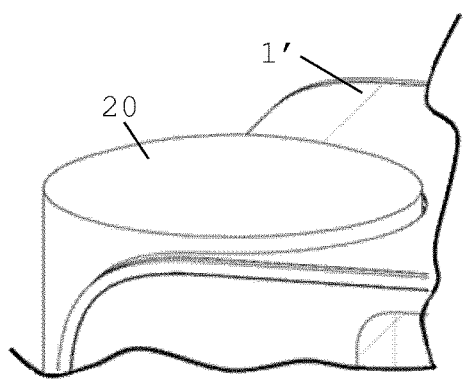
FIG. 4 is a perspective view of part of the outside of the machine in a capsule extraction configuration.
Figure 4A:
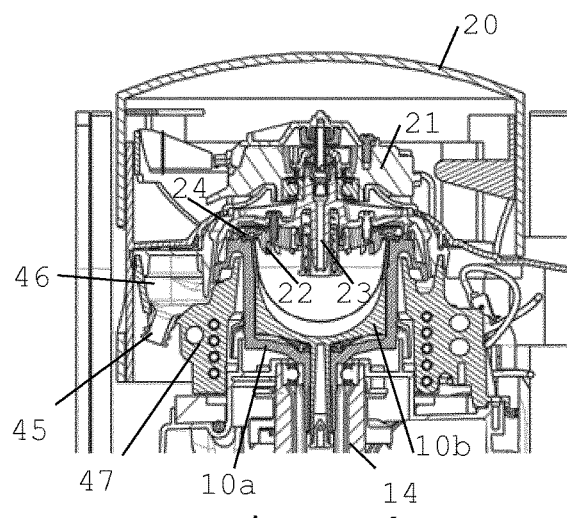
FIG. 4a is a cross-sectional view of the machine shown in FIG. 4.

Machine 1 has a capsule holder 10 delimiting a cavity 11 with an upwardly oriented mouth 12, such as a mouth 12 generally contained in a horizontal plane, for receiving capsule 5 via mouth 12 so that capsule flange extends generally in parallel to mouth 12. For instance, capsule holder 10 is drivable in rotation by a motorized drive axis 14. See FIGS. 1*a* and 4*a*.

Machine 1 includes a capsule transfer device 30 having a capsule guide 31 for guiding capsule 5 from capsule holder 10 to a used-capsule evacuation area 40. See FIGS. 3 and 8. Evacuation area 40 may include at least one of an evacuation channel 41, e.g. an inclined evacuation ramp 41, and a used-capsule collector 42. See FIG. 1*a*.

Figure 6:
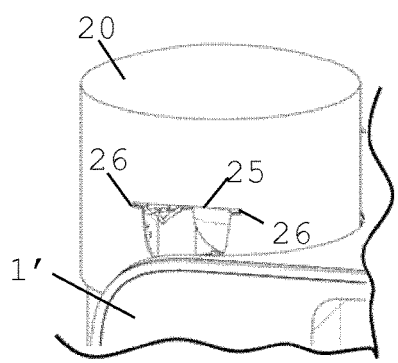
Figure 6A:
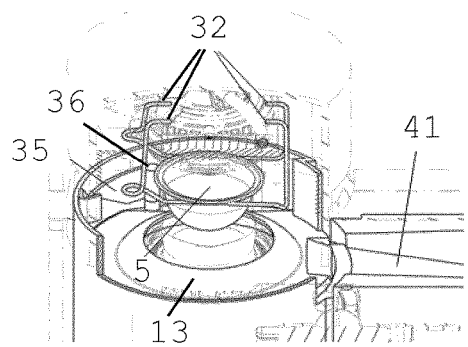
Figure 7:
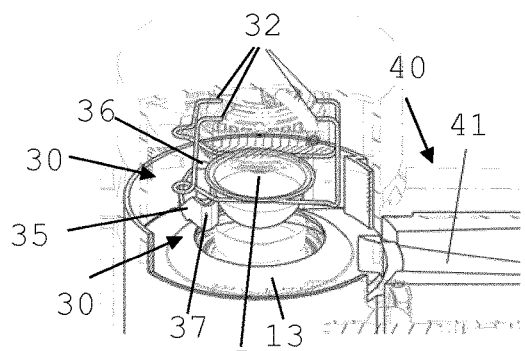
Figure 8:
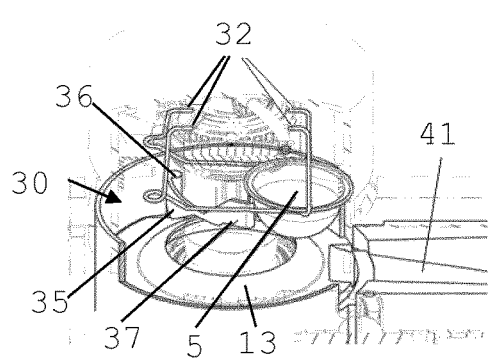
Figure 9:
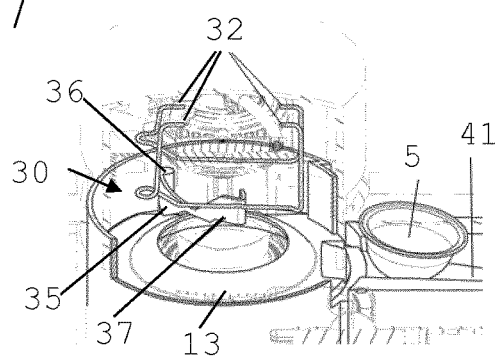

Capsule guide 31 includes a pair of facing slides 311,312 having each a holding section 311*a*,312*a* configured to hold, e.g. seize, capsule 5 between slides 311,312 under flange 51 and hold capsule 5 above capsule holder 10. For instance, holding section 311*a*,312*a* is configured to lift capsule 5 above capsule holder 10 and/or maintain the capsule above the capsule holder while the capsule holder is withdrawn under the capsule. See FIGS. 1 and 6*a*.

Capsule transfer device 30 comprises a capsule mover for moving capsule 5 from holding section 311*a*,312*a* used-capsule evacuation area 40. For example, capsule mover 35 comprises at least one of a mechanical, electromechanical, magnetic and electromagnetic actuator. See FIGS. 7 to 9.

Capsule mover 35 may include a capsule pusher and/or puller for pushing and/or pulling capsule 5 from holding section 311*a*,312*a* to used-capsule evacuation area 40.

For instance, capsule mover 35 is configured to mechanically move capsule 5. Capsule mover 35 can be translationally and/or pivotally mounted. Capsule mover 35 may form an arm that is mounted on a pivoting axis 36 for pivoting between a collapsed position and a deployed position with a portion 37 configured to intercept capsule 5 on holding section 311*a*,312*a* and to move capsule 5 to used-capsule evacuation area 40 when arm 35 is pivoted from the collapsed position to the deployed position. See FIGS. 7 to 9.

One or both slides 311,312 of the pair of facing slides 311,312 may have a wire or stripe or rail, such as a grooved rail or a head rail, to form slide 311,312. See FIG. 3.

One or both slides 311,312 of the pair of facing slides 311,312 can include an introduction section 311*c*,312*c* leading to holding section 311*a*,312*a* for guiding capsule 5 to holding section 311*a*,312*a* prior to receiving capsule 5 in cavity 11 of capsule holder 10 via mouth 12, such as an introduction section 311*c*,312*c* along which capsule 5 slides to holding section 311*a*,312*a* under the effect of gravity. For instance, introduction section 311*c*,312*c* is angled downwards towards holding section 311*a*,312*a*. Introduction section 311*c*,312*c* may form an extension of holding section 311*a*,312*a* e.g. an extension 311*c*,312*c* downwardly angled to holding section 311*a*,312*a*. See FIG. 3.

One or both slides 311,312 of the pair of facing slides 311,312 may include an evacuation section 311*b*,312*b* between which and along which capsule 5 slides to used-capsule evacuation area 40 under the effect of gravity. For instance, evacuation section 311*b*,312*b* is angled downwards from holding section 311*a*,312*a* and/or configured to hold capsule 5 between slides 311,312 under flange 51. See FIG. 3.

Machine 1 typically includes a top part 20, located above and facing capsule holder 10. Capsule holder 10 and top part 20 can be relatively movable, such as movable automatically e.g. by a motor. See FIGS. 1*a* and 4*a*. For instance, capsule holder 10 and top part 20 are relatively movable:

into a relatively distant position for inserting capsule 5 into capsule holder 10 and for removing capsule 5 from capsule holder 10 by using capsule transfer device 30; and into a relatively close position for extracting capsule 5 in capsule holder 10, such as a position in which capsule holder 10 and top part 10 form a generally confined extraction chamber.

Capsule holder 10 and top part 20 may be translationally relatively movable from the distant position into the close position and vice versa, e.g. along an axial direction 11' of cavity 11 and/or along a straight line 11'. See FIGS. 1*a* and 4*a*.

Top part 20 may have a lid arrangement 21 cooperating with mouth 12 of capsule holder 10, e.g. a lid arrangement 21 drivable in rotation via a motorized drive axis 14. See FIGS. 1*a* and 4*a*.

Lid arrangement 21 can have one or more capsule opening elements 22, such as piercing blades and/or pins. See FIG. 4*a*.

Lid arrangement 21 may have a liquid inlet, e.g. a central inlet 23, for feeding a liquid into capsule 5 and/or a liquid outlet 24, e.g. one or more peripheral outlets 24, for evacuating liquid from capsule 5. See FIG. 4*a*.

Lid arrangement 21 can have an axis of rotation 14, lid arrangement 21 being rotatably mounted in an outer housing and/or frame of top part 20. See FIG. 4*a*.

Figure 2:
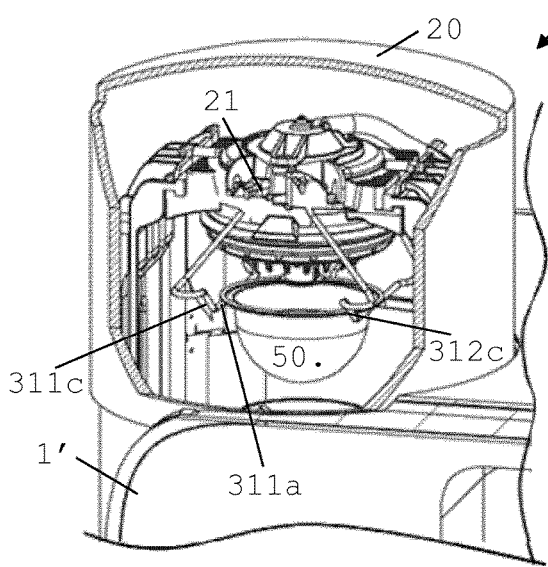
FIG. 2 is a slightly enlarged view of the perspective view of FIG. 1 in which part of the machine has been cut away to show the inside of the machine.
Figure 3:
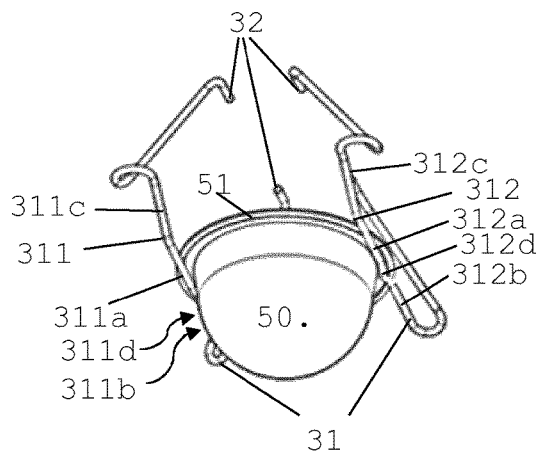
FIG. 3 is a perspective view of a machine's capsule guide holding a capsule.

As illustrated in FIGS. 2 and 3, capsule guide 31 can have at least one connection part 32, each slide 311,312 having for instance a pair of extremal connection parts 32, connected to top part 20 so that when capsule holder 10 and top part 20 are relatively moved:

into the relatively distant position, capsule guide 31 is relatively moved away from capsule holder 10, optionally for withdrawing capsule 5 held by holding section 311*a*,312*a* out of cavity 11 of capsule holder 10; and into the relatively close position, capsule guide 31 is relatively moved against capsule holder 10, optionally for introducing capsule 5 held by holding section 311*a*,312*a* into cavity 11 of capsule holder 10.

Figure 5:
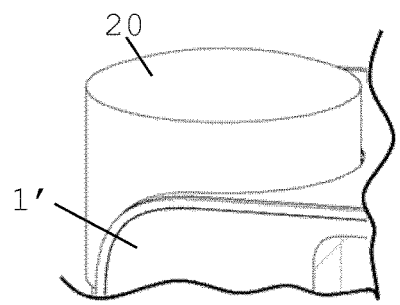
FIGS. 5 and 6 are perspective views of part of the outside of the machine of FIG. 1 when a capsule is being removed from the capsule holder and evacuated to a capsule evacuation area.
Figure 5A:
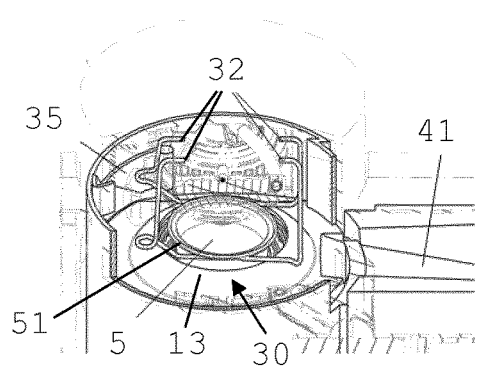
FIGS. 5*a*, 6*a*, 7, 8 and 9 are perspective views of the machine partly cut away to show the inside of the machine when a capsule is being removed from the capsule holder and evacuated to a capsule evacuation area.

Capsule holder 10 can have at least one controller (FIG. 5*a*), e.g. a control face 13 along which capsule guide 31 is guided between the relatively distant and close positions, for moving holding section 311*a*,312*a*:

away from capsule body 50 and from under flange 51 of capsule 5 when capsule holder 10 and top part 20 are relatively moved to the relatively close position; and against capsule body 50 and under flange 51 of capsule when capsule holder 10 and top part 20 are relatively moved to the relatively open position.

Capsule guide 31 can be configured to return automatically against capsule body 50 or away from capsule body 50, e.g. by being mounted to top part 20 via a bias element such as a spring and/or by being made of a resilient element such as a spring element.

Machine 1 may have a main machine body 1', such as a main body 1' having an outside housing, top part 20 being configured to telescope, e.g. vertically, into and out from main body 1' between the distant and the closed positions. Capsule holder 10 can be in main body 1'.

Top part 20 may include an opening 25 for supplying capsule 5 to mouth 12 of capsule holder 10. See FIGS. 1 and 6.

Opening 25 may lead to holding section 311a,312a e.g. via an introduction section 311c,312c of capsule guide 31. See FIGS. 1, 2 and 3.

Opening 25 can have a shape 25 generally matching a longitudinal cross-section of capsule 5, e.g. a shape 25 with opposite slots 26 matching capsule flange 51 and optionally leading to capsule guide 31 such that when capsule 5 is passed via opening 25 its flange 51 is taken on by guide 31. See FIGS. 1, 2 and 6.

Opening 25 may be configured to allow a passage of capsule 5 when capsule holder 10 and top part 20 are in the relatively distant position and configured to prevent a passage of capsule 5 when capsule holder 10 and top part 20 are in the relatively close position. See FIGS. 1, 4, 5 and 6.

Capsule guide 31 may include at least one stop element 311d,312d for immobilizing capsule 5 on holding section 311a,312a, capsule mover 35 being configured for driving capsule 5 from holding section 311a,312a over or beyond stop element 311c,312c to used-capsule evacuation area 40. See FIGS. 3, 7, 8 and 9.

Capsule guide 31 may include a pair of stop elements 311d,312d generally facing one another on each side of capsule 5 when capsule 5 is driven over or beyond stop elements 311d,312d by the capsule mover 35.

Stop element 311d,312d may project from one of slide 311,312 and may be urged against or into capsule body 50 of capsule 5 when capsule 5 is driven over or beyond stop elements 311d,312d by capsule mover 35. For instance, capsule guide 31 includes a pair of such stop elements 311d,312d facing each other. Stop element(s) 311c,312c can be formed by a bent part of slides 311,312.

Stop element 311d,312d can be configured to be urged away by capsule 5 when capsule 5 is driven over stop elements 311d,312d by capsule mover 35, such as a pair of such stop elements 311d,312d facing each other.

Stop element may be configured to penetrate capsule body 50 when capsule 5 is driven over or beyond stop elements 311d,312d by capsule mover 35, such as a pair of such stop elements 311d,312d facing each other.

Holding section 311a,312a may extend generally in parallel to a plane generally containing mouth 12 of cavity 11 e.g. a horizontal plane. For instance, holding section 311a, 312a and plane are relatively movable, e.g. for receiving capsule 5 in cavity 11 and/or for removing capsule 5 from cavity 11, and remain generally parallel to one another during the entire movement.

Holding section 311a,312a can extend in a generally horizontal direction to an evacuation section 311b,312b that extends down from holding section 311a,312a, the pair of facing slides 311,312 comprising an introduction section 311c,312c leading downwards to holding section 311a,312a for guiding capsule 5 to holding section 311a,312a prior to receiving capsule 5 in cavity 11 of capsule holder 10 via the mouth 12.

Capsule holder 10 may include a support 10a, e.g. an outer support 10a and an ejector 10b, e.g. in support 10b, movable relatively to support 10a, ejector 10b being configured to raise flange 51 of capsule 5 above capsule holder 10 so as to facilitate seizure of capsule 5 between slides 311,312 under flange 51. See FIGS. 1a and 4a.

Ejector 10b may delimit at least part of cavity 11.

Ejector 10b can be mounted telescopically and/or resiliently, e.g. via a spring 10c, to outer support 10a.

Capsule holder 10 can be in fluid connection with a machine outlet 45, such as an outlet 45 dispensing beverage to outside such machine 1. For instance, outlet 45 is in fluid connection with capsule holder 10 via a beverage collector 46, such as a collector 46 connected to a thermal conditioner 47, e.g. a heater and/or a cooler, for adjusting a temperature of collector 46. See FIGS. 1a and 4a.

During operation, capsule 5 is processed by: holding capsule 5 between slides 311,312 under flange 51 to hold capsule 5 above capsule holder 10; and moving capsule 5 with capsule mover 35 from holding section 311a,312a to used-capsule evacuation area 40.

As mentioned above, capsule 5 has a flange 51 and a body 50 that can be, symmetric or asymmetric, conical or frusto-conical or cylindrical or spherical or hemispherical or frusto-spherical or domical or frusto-domical, containing the ingredient, e.g. ground coffee, tea or cacao or another beverage ingredient.

The invention claimed is:

1. A capsule processing machine for preparing a beverage from a capsule having a body containing an ingredient and a peripherally projecting flange, the capsule processing machine comprising:
a capsule holder defining a cavity with an upwardly oriented mouth for receiving the capsule via the mouth so that the capsule flange extends generally in parallel to the mouth;
a capsule transfer device having a capsule guide for guiding the capsule from the capsule holder to a used-capsule evacuation area;
the capsule guide comprising a pair of facing slides having each a holding section configured to hold the capsule between the slides under the flange and hold the capsule above the capsule holder; and
the capsule transfer device comprises a capsule mover for moving the capsule from the holding section to the used-capsule evacuation area;
wherein the capsule guide comprises at least one stop element for immobilizing the capsule on the holding section, the capsule mover being configured for driving the capsule from the holding section over or beyond the at least one stop element to the used-capsule evacuation area.

2. The machine of claim 1, wherein the capsule mover comprises a capsule pusher and/or puller for pushing and/or pulling the capsule from the holding section to the used-capsule evacuation area.

3. The machine of claim 1, wherein one or both slides of the pair of facing slides comprise(s) a structure selected from the group consisting of:
a wire or stripe or rail;
an introduction section leading to the holding section for guiding the capsule to the holding section prior to receiving the capsule in the cavity of the capsule holder via the mouth; and an evacuation section between which and along which the capsule slides to the used-capsule evacuation area under the effect of gravity.

4. The machine of claim 1, wherein the holding section extends generally in parallel to a plane generally containing the mouth of the cavity.

5. The machine of claim 1, wherein the holding section extends in a generally horizontal direction to an evacuation section that extends down from the holding section, the pair of facing slides comprising an introduction section leading downwards to the holding section for guiding the capsule to the holding section prior to receiving the capsule in the cavity of the capsule holder via the mouth.

6. The machine of claim 1, wherein the capsule holder comprises a support and an ejector, movable relatively to the support, the ejector being configured to raise the flange of the capsule above the capsule holder so as to facilitate seizure of the capsule between the slides under the flange.

7. The machine of claim 1, wherein the capsule holder is in fluid connection with a machine outlet.

8. The machine of claim 1, wherein the at least one stop element comprises a pair of stop elements for immobilizing the capsule on the holding section, the pair of stop elements facing one another on each slide of the pair of facing slides.

9. The machine of claim 1, wherein the at least one stop element is configured to penetrate the body of the capsule when the capsule is driven over the at least one stop element by the capsule mover.

10. The machine of claim 1, wherein the at least one stop element is formed by a bent part of a slide of the pair of facing slides.

11. The machine of claim 10, wherein the at least one stop element is configured to be urged away by the capsule when the capsule is driven over the stop element by the capsule mover.

12. The machine of claim 1, comprising a top part, located above and facing the capsule holder, the capsule holder and the top part being relatively movable:
    into a relatively distant position for inserting the capsule into the capsule holder and for removing the capsule from the capsule holder with the capsule transfer device; and
    into a relatively close position for extracting the capsule in the capsule holder.

13. The machine of claim 12, wherein the capsule guide comprises at least one connection part, each slide having a pair of extremal connection parts, connected to the top part so that when the capsule holder and the top part are relatively moved:
    into the relatively distant position, the capsule guide is relatively moved away from the capsule holder; and
    into the relatively close position, the capsule guide is relatively moved against the capsule holder.

14. The machine of claim 12, which has a main machine body having an outside housing, the top part being configured to telescope into and out from the main body between the distant and the closed positions.

15. The machine of claim 12, wherein the top part comprises an opening for supplying the capsule to the mouth of the capsule holder.

16. A method of processing a capsule in a machine comprising a capsule holder defining a cavity with an upwardly oriented mouth for receiving the capsule via the mouth so that the capsule flange extends generally in parallel to the mouth; a capsule transfer device having a capsule guide for guiding the capsule from the capsule holder to a used-capsule evacuation area; the capsule guide comprising a pair of facing slides having each a holding section configured to hold the capsule between the slides under the flange and hold the capsule above the capsule holder; and the capsule transfer device comprises a capsule mover for moving the capsule from the holding section to the used-capsule evacuation area, the method comprising:
    holding the capsule between the slides under the flange to hold the capsule above the capsule holder, wherein the capsule guide comprises at least one stop element for immobilizing the capsule on the holding section; and
    moving the capsule with the capsule mover from the holding section to the used-capsule evacuation area, the capsule mover driving the capsule from the holding section over or beyond the at least one stop element to the used-capsule evacuation area.

17. A combination of a machine for preparing a beverage from a capsule having a body containing an ingredient and a peripherally projecting flange comprising: a capsule holder defining a cavity with an upwardly oriented mouth for receiving the capsule via the mouth so that the capsule flange extends generally in parallel to the mouth; a capsule transfer device having a capsule guide for guiding the capsule from the capsule holder to a used-capsule evacuation area; the capsule guide comprising a pair of facing slides having each a holding section configured to hold the capsule between the slides under the flange and hold the capsule above the capsule holder; and the capsule transfer device comprises a capsule mover for moving the capsule from the holding section to the used-capsule evacuation area and a capsule for being handled by the slides and the capsule mover, wherein the capsule guide comprises at least one stop element for immobilizing the capsule on the holding section, the capsule mover being configured for driving the capsule from the holding section over or beyond the at least one stop element to the used-capsule evacuation area.

* * * * *